(12) United States Patent
Chen et al.

(10) Patent No.: US 12,259,987 B2
(45) Date of Patent: Mar. 25, 2025

(54) MANAGING ACCESS TO DATA

(71) Applicant: OnData, Inc., Austin, TX (US)

(72) Inventors: Shaofei Chen, Austin, TX (US); Daniel Cole Harrell, Colorado Springs, CO (US)

(73) Assignee: OnData, Inc., Austin, TX (US)

( * ) Notice: Subject to any disclaimer, the term of this patent is extended or adjusted under 35 U.S.C. 154(b) by 252 days.

(21) Appl. No.: 17/811,986

(22) Filed: Jul. 12, 2022

(65) Prior Publication Data
US 2024/0020400 A1 Jan. 18, 2024

(51) Int. Cl.
| | | |
|---|---|---|
| G06F 21/62 | (2013.01) | |
| G06F 21/60 | (2013.01) | |
| G06F 21/78 | (2013.01) | |
| H04L 9/32 | (2006.01) | |
| H04L 9/28 | (2006.01) | |

(52) U.S. Cl.
CPC ........ G06F 21/6218 (2013.01); G06F 21/602 (2013.01); H04L 9/3213 (2013.01)

(58) Field of Classification Search
None
See application file for complete search history.

(56) References Cited

U.S. PATENT DOCUMENTS

| | | | |
|---|---|---|---|
| 9,037,610 B2 | 5/2015 | Rissanen | |
| 9,307,409 B2* | 4/2016 | Sheikh | H04L 67/04 |
| 9,400,892 B2* | 7/2016 | Rajakarunanayake | G06F 21/6218 |
| 9,569,634 B1 | 2/2017 | Yanacek et al. | |
| 9,774,586 B1* | 9/2017 | Roche | H04L 63/08 |
| 10,225,325 B2 | 3/2019 | Schincariol et al. | |
| 10,237,115 B2* | 3/2019 | Yoon Lee | H04L 41/0213 |
| 10,572,315 B1* | 2/2020 | Lusk | G06F 9/541 |
| 10,831,811 B2* | 11/2020 | Kraus | G06F 16/3346 |
| 2005/0236474 A1 | 10/2005 | Onuma | |

(Continued)

FOREIGN PATENT DOCUMENTS

CN 107403106 B 11/2017

OTHER PUBLICATIONS

Authorization Model Of SSO For a Distributed Environment Based On The Attributes. Zhang. IEEE. (Year: 2012).*

*Primary Examiner* — Venkat Perungavoor
(74) *Attorney, Agent, or Firm* — McDermott Will & Emery LLP

(57) ABSTRACT

Managing access to data, including storing a database that includes fields; encrypting data of all or some fields of the database using an application encryption algorithm; receiving data indicating user-specific data access roles and user-specific data permissions for each of the user-specific data access roles, each of the user-specific data permissions defining a subset of the data of the database that the corresponding user-specific data access role has authorization for decrypting the subset of the data; receiving a user token representing credentials and user-specific data access roles of an authorized user, wherein the user token is generated by the access rights system; receiving a query for requested data stored by the database; comparing the user-specific data access role of the user token with the user-specific data access roles of the access rights system to identify user-specific data permissions for the user-specific data access role of the user token.

20 Claims, 4 Drawing Sheets

(56) References Cited

U.S. PATENT DOCUMENTS

| | | | |
|---|---|---|---|
| 2011/0167483 A1* | 7/2011 | Lee | G06F 21/6218 |
| | | | 726/6 |
| 2015/0127680 A1* | 5/2015 | Dutta | G06F 16/245 |
| | | | 707/771 |
| 2015/0142727 A1* | 5/2015 | Louie | G06F 16/248 |
| | | | 707/603 |
| 2015/0237157 A1* | 8/2015 | Wang | G06F 16/278 |
| | | | 714/4.11 |
| 2018/0025114 A1 | 1/2018 | Chaffee | |
| 2018/0262510 A1* | 9/2018 | Su | G06F 21/6218 |
| 2019/0319954 A1* | 10/2019 | Chimakurthi | H04L 63/10 |
| 2020/0301940 A1* | 9/2020 | Hollander | G06F 16/254 |
| 2021/0209077 A1 | 7/2021 | Snellman et al. | |

\* cited by examiner

MANAGING ACCESS TO DATA

BACKGROUND

Field of the Disclosure

The disclosure relates generally to managing access to data stored by a database.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in a method of managing access to data, including storing, at a database server, a database that includes a plurality of fields; encrypting, at the database server and by a database driver of an application computing device, data of all or some fields of the database using an application encryption algorithm; receiving, by the database driver and from an access rights system, data indicating user-specific data access roles and user-specific data permissions for each of the user-specific data access roles, each of the user-specific data permissions defining a subset of the data of the database that the corresponding user-specific data access role has authorization for decrypting the subset of the data; receiving, by the database driver, a user token representing credentials and user-specific data access roles of an authorized user, wherein the user token is generated by the access rights system; receiving, at the database driver, a query for requested data stored by the database; validating, by the database driver, the user token; comparing, by the database driver, the user-specific data access role of the user token with the user-specific data access roles of the access rights system to identify user-specific data permissions for the user-specific data access role of the user token; and determining, by the database driver and based on the comparing, whether the user-specific data permissions for the user-specific data access role identified within the user token includes authorization for decrypting the requested data for the authorized user, including: determining that the user-specific data permissions for the user-specific data access role identified within the user token indicates that read access is authorized for the requested data, and in response, displaying the requested data as unencrypted or unmasked data.

Other embodiments of these aspects include corresponding systems, apparatus, and computer programs, configured to perform the actions of the methods, encoded on computer storage devices.

These and other embodiments may each optionally include one or more of the following features. For instance, determining, by the database driver and based on the comparing, whether the user-specific data permissions for the user-specific data access role identified within the user token includes authorization for decrypting the requested data for the authorized user further includes: determining that the user-specific data permissions for the user-specific data access role identified within the user token indicates that read access is not authorized for the requested data, displaying the requested data as encrypted or masked data. Determining, by the database driver and based on the comparing, whether the user-specific data permissions for the user-specific data access role identified within the user token includes authorization for decrypting the requested data for the authorized user further includes: determining that the user-specific data permissions for the user-specific data access role identified within the user token indicates write access is authorized for the requested data, and in response, encrypting data fields modified by the user and updating the database with the modifications to the data fields. Determining, by the database driver and based on the comparing, whether the user-specific data permissions for the user-specific data access role identified within the user token includes authorization for decrypting the requested data for the authorized user further includes: determining that the user-specific data permissions for the user-specific data access role identified within the user token indicates write access is not authorized for the requested data, and in response, rejecting any request for modification. Recording, by the database driver, an audit log including user-specific data access information for the requested data. The user token is attached as a comment to the query. Refraining from adding additional query clauses to the query. The application encryption algorithm is an application agnostic encryption algorithm.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
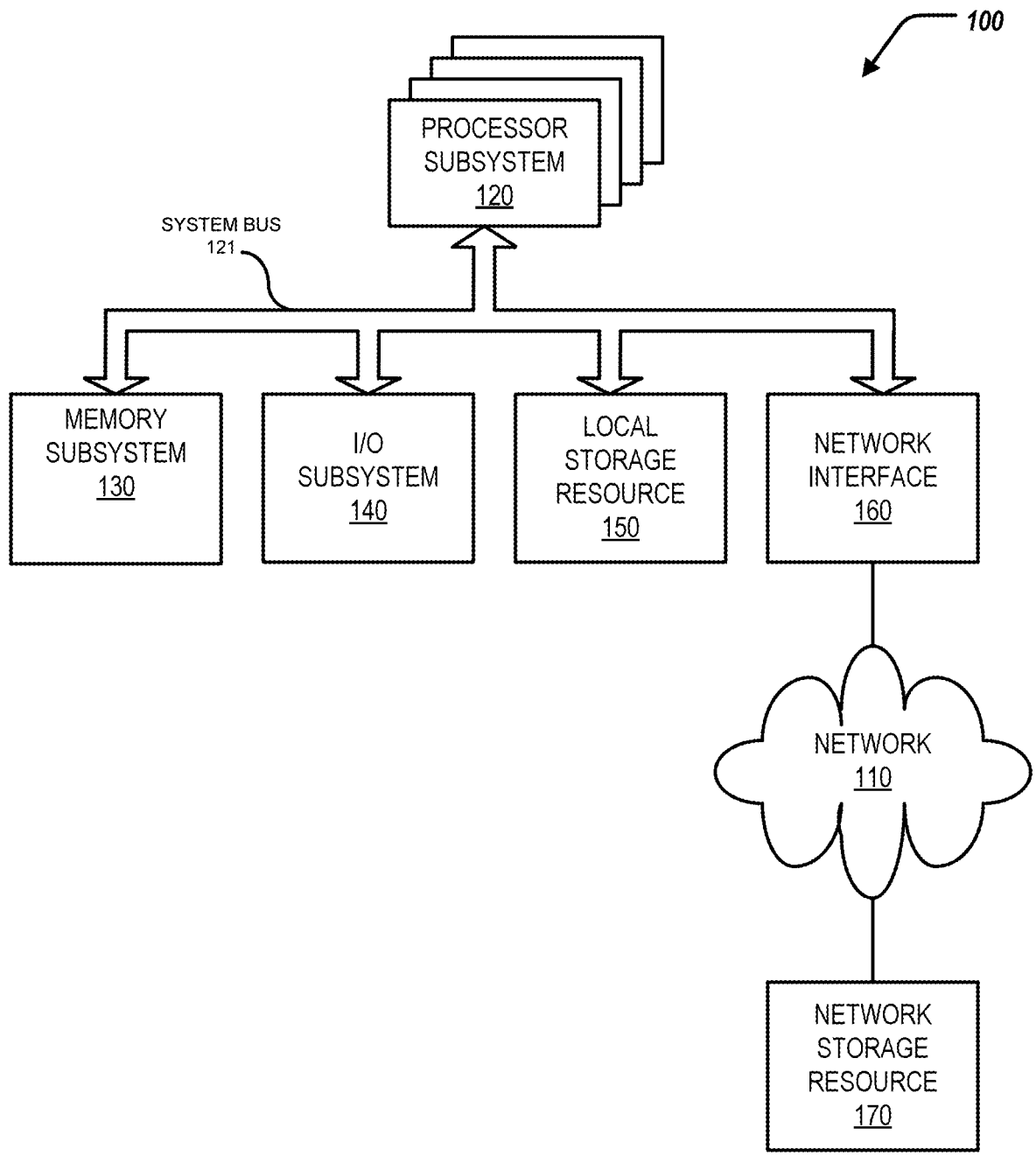
FIG. 1 is a block diagram of selected elements of an embodiment of an information handling system.

This disclosure discusses methods and systems for managing access to data of an information handling system. In short, an application computing device can encrypt a portion or the entirety of a database. Further, an access policy implemented by an access rights system can initially deny access to the database, and only allow particular user roles to access particular subsets of data inside the database based on the access policy. That is, a database driver controls access to the database and selects on a portion of the database that is accessible based on a user token (associated with a user) and an access policy. Thus, at a high-level, the database is encrypted initially (by a system other than a system that provides access to the database), and the access policy is to deny access to the database to everyone, and only provide access to the database based on approved access, described further herein. Thus, no additional query clauses to limit the access to the data of the database are appended, only the affected data fields are encrypted or decrypted when required to access/receive the data of the database.

Specifically, this disclosure discusses a system and a method for managing access to data, including storing, at a database server, a database that includes a plurality of fields; encrypting, at the database server and by a database driver of an application computing device, data of all or some fields of the database using an application encryption algorithm; receiving, by the database driver and from a access rights system, data indicating user-specific data access roles and user-specific data permissions for each of the user-specific data access roles, each of the user-specific data permissions defining a subset of the data of the database that the corresponding user-specific data access role has authorization for decrypting the subset of the data; receiving, by the database driver, a user token representing credentials and user-specific data access roles of an authorized user, wherein the user token is generated by the access rights system or other authorization token service; receiving, at the database driver, a query for requested data stored by the database; validating, by the database driver, the user token; comparing, by the database driver, the user-specific data access role of the user token with the user-specific data access roles of the access rights system to identify user-specific data permissions for the user-specific data access role of the user token; and determining, by the database driver and based on the comparing, whether the user-specific data permissions for the user-specific data access role identified within the user token includes authorization for decrypting the requested data for the authorized user, including: determining that the user-specific data permissions for the user-specific data access role identified within the user token indicates that read access is authorized for the requested data, and in response, displaying the requested data as unencrypted or unmasked data.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-4 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2:
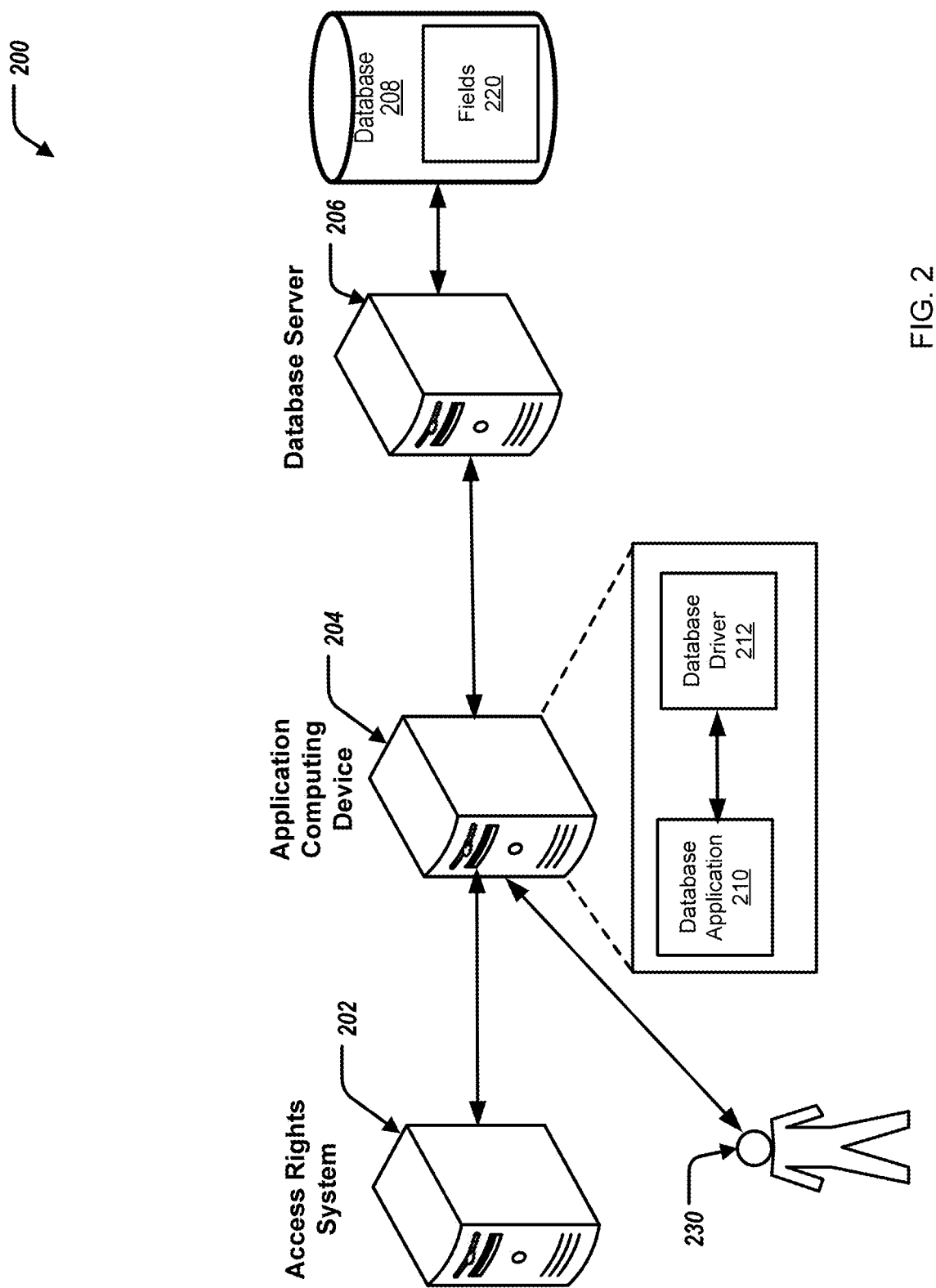
FIG. 2 illustrates a block diagram of a computing environment including multiple information handling systems, and a database.

Turning to FIG. 2, FIG. 2 illustrates an environment 200 including an access rights system 202, an application computing device 204, a database server 206, and a database 208. Any of the access rights system 202, the application computing device 204, and the database server 206 can be similar to, or include, the information handling system 100 of FIG. 1. In some examples, the access rights system 202 is an identity and access management system or an authorization token service.

The access rights system 202 can be in communication with the application computing device 204. The application computing device 204 can be in communication with the access rights system 202 and the database server 206. The database server 206 can be in communication with the application computing device 204 and the database 208.

The application computing device 204 can include a database application 210 and a database driver 212. In some examples, the application computing device 204 can be a local computing device, or a server computing device.

In short, the application computing device 204 can encrypt an entirety (or a subset) of the database 208 and the fields 220. Further, an access policy token implemented by the access rights system 202 (or other access policy token system) can initially deny access to the database 208, and only allow particular user roles to access particular subsets of data of the database 208 based on the access policy. That is, the database driver 212 controls access (or what the user sees) to the database 208 and selects on a portion of the database 208 that is accessible based on a user token (associated with a user) and an access policy. Thus, at a high-level, the database 208 is encrypted initially (by a system other than a system that provides access to the database 208), and the access policy is to deny access (i.e., visibility to the encrypted data) to the database 208 to everyone, and only provide access to the database 208 based on approved access, described further herein. Thus, no additional query statement clauses to limit the access to the data of the database 208 are appended when accessing/receiving the data of the database 208, only the data fields are encrypted or decrypted if required.

Figure 3:
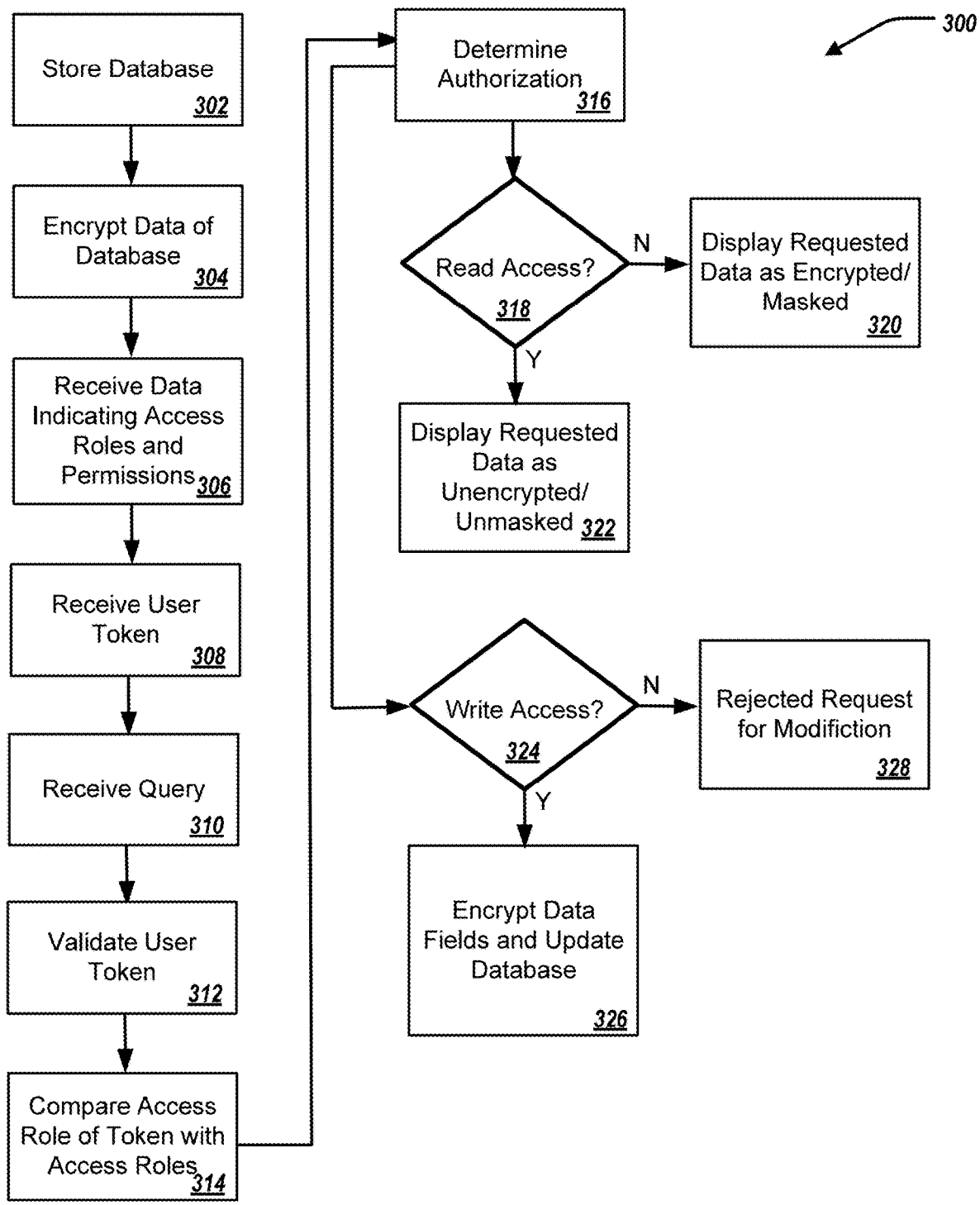
FIG. 3 illustrates a graphical user interface for managing access to data.

FIG. 3 illustrates a flowchart depicting selected elements of an embodiment of a method 300 for managing access to data. The method 300 may be performed by the information handling system 100, the access rights system 202, the application computing device 204, and/or the database server 206, and with reference to FIGS. 1-2. It is noted that certain operations described in method 300 may be optional or may be rearranged in different embodiments.

The database server 206 stores the database 208, at 302. The database 208 can include a plurality of fields 220.

The database driver 212 of the application computing device 204 can encrypt, at the database server 206, data of some or all fields 220 of the database 208 using an application encryption algorithm, at 304. That is, some or all of the data of the database 208 is encrypted. The encryption of the database 208 and the fields 220 is performed by a computing device separate and distinct from the database server 206 (i.e., the database driver 212 and the application computing device 204). As a result, the database server 206 can be utilized primarily for retrieving and storing data at the fields 220. Thus, computational resources of the application computing device 204 can be leveraged for encryption and decryption as opposed to such encryption steps being performed by the database server 206.

In some examples, the application encryption algorithm is an application agnostic encryption algorithm. In some examples, the application agnostic encryption algorithm is format preserving encryption.

The database driver 212 of the application computing device 204 can receive, from the access rights system 202 (or other access token generation system), data that indicates user-specific roles and user-specific data permissions for each of the user-specific data access roles, at 306. That is, each of the user-specific data permissions define a subset of the data of the database 208 (fields 220) that the corresponding user-specific data access role has authorization for decrypting (and/or accessing) the subset of the data. For example, for a first user-specific role, the first user-specific role can access a first subset of the data of the database 208 defined by a first user-specific data permission. For example, for a second user-specific role, the second user-specific role can access a second subset of the data of the database 208 defined by a second user-specific data permission. In some examples, the first subset of the data of the database 208 is exclusive of the second subset of the data of the database 208. In some examples, the first subset of the data of the database 208 and the second subset of the data of the database 208 share at least a portion of common data.

The database driver 212 of the application computing device 204 can receive, from the access rights system 202, a user access token, at 308. The user token can represent credentials of an authorized user 230. The user token can further represent user-specific data access roles of the authorized user 230. The user token can be generated by the access rights system 202 or other access token provider.

Figure 4:
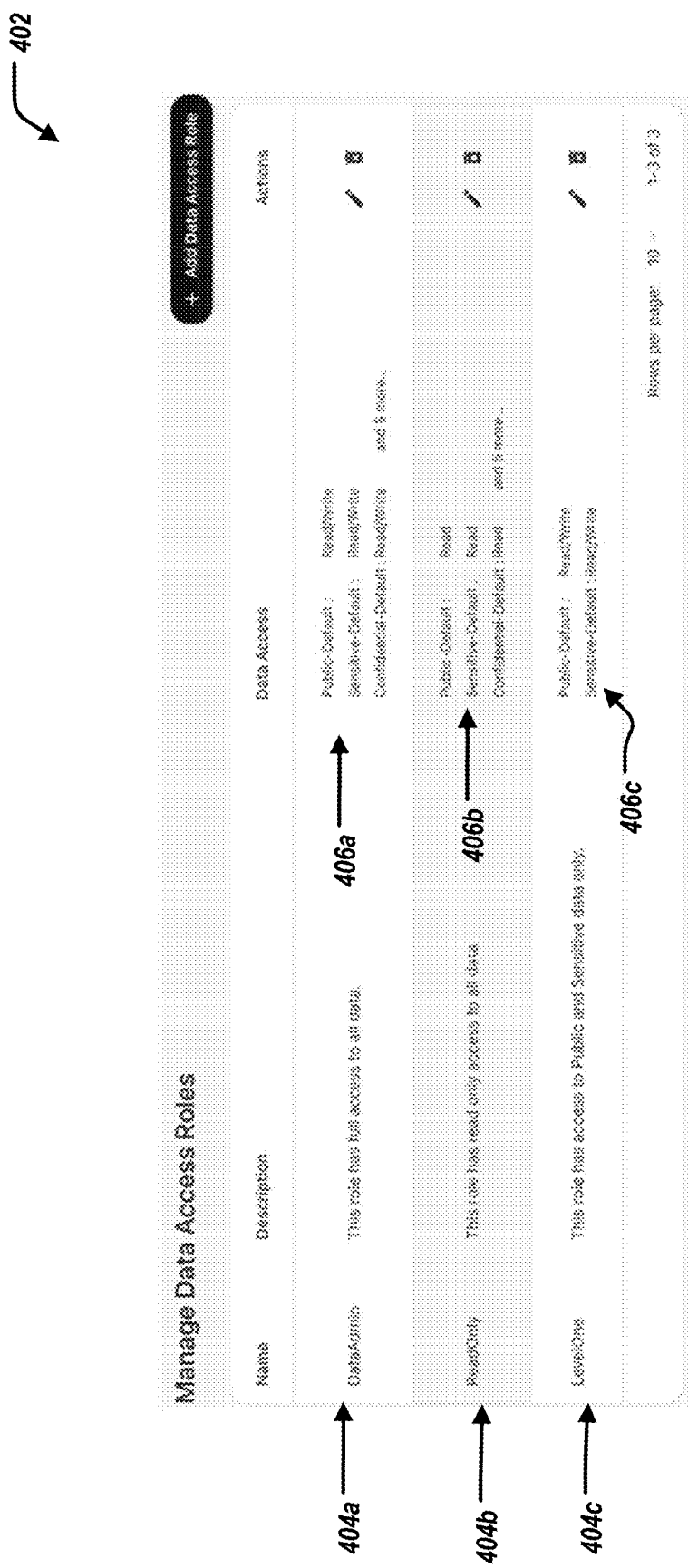
FIG. 4 illustrates a method for managing access to data.

FIG. 4 illustrates a graphical user interface 402 illustrating a table indicating data access roles, descriptions, and data permissions. The access roles can include, for example, data access roles 404a, 404b, 404c. For example, data access role 404a is a "DataAdmin" role; the data access role 404b is a "ReadOnly" role; and data access role 404c is a "LevelOne" role. The data access role 404a can be defined by data permissions 406a; the data access role 404b can be defined by data permissions 406b; and the data access role 404c can be defined by data permissions 406c. The data permissions 406a, 406b and 406c can define such permissions as read/write permissions, described further herein.

Returning back to FIG. 3, the database driver 212 receives a query, from the database application 210, for requested data stored at the fields 220 of the database 208, at 310. That is, the user 230 provides the query through a graphical user interface (GUI) representing the database application 210. In some examples, the user token is attached to the query as a comment.

In some examples, the access rights system 202 and/or the application computing device 204 refrains from adding additional query clauses to the query in order to control a user's access to data. In other words, the (original) query is maintained without adding additional query clauses. That is, any data fields in the query that are required to be encrypted will be encrypted by the database driver 212 at the application computing device 204 before the query is passed to the database server 206. As a result, a complexity of the query is reduced, processing of the query at the database server 206 is reduced, processing overhead is reduced, and increased protection of the data of the database 208 is provided.

The database driver 212 validates the user token, at 312. That is, the database driver 212 validates the user token that is signed by the access rights system 202 to ensure that the user token is issued by the access rights system 202 and not expired, and all relevant attributes in the user token are valid. For example, the access rights system 202 can use a private key to sign the token, and the application computing device 204 can utilize a public key to validate the signature to ensure that the token is trusted.

The database driver 212 can compare the user-specific data access role of the user token with the user-specific data access roles of the access rights system 202, at 314. The database driver 212, based on such comparison, identifies user-specific data permissions for the user-specific data access role of the user token. For example, as mentioned herein, the user token can represent user-specific data access roles of the authorized user 230. The database driver 212 compares the user-specific data access roles of the user token with the user-specific data access roles delineated by the access rights system 202 to identify user-specific data permissions for the user-specific data access role of the user token. For example, referring to FIG. 4, when the token indicates the data access role 404a, the data permission for the data access role 404a are the data permissions 406a.

The database driver 212 determines, based on the comparing (comparing the user-specific data access role of the user token with the user-specific data access roles of the access rights system 202 to identify the user-specific data permissions for the user-specific data access role of the user token), whether the user-specific data permissions for the user-specific data access role identified within the user token includes authorization for decrypting the requested data for the authorized user, at 316. For example, the data permissions can include read and/or write access.

In some examples, the database driver 212 determines that the user-specific data permission for the user-specific data access role identified within the user token indicates that read access is authorized for the requested data of the database 208 and the fields 220, at 318. That is, for the user-specific data access role of the user token, the data permissions for such data access role for the requested data (as indicated by the access rights system 202) includes at least read access for the requested data (requested data in view of the query). In response to determining that the user-specific data permission for the user-specific data access role identified within the user token indicates that read access is authorized for the requested data of the database 208 and the fields 220, the requested data is displayed as unencrypted or unmasked data, at 320. For example, the requested data is displayed as unencrypted or unmasked data by a graphical user interface of a display device associated with the application computing device 204 to the user 230.

In some examples, the database driver 212 determines that the user-specific data permission for the user-specific data access role identified within the user token indicates that read access is not authorized for the requested data of the database 208 and the fields 220, at 318. That is, for the user-specific data access role of the user token, the data permissions for such data access role for the requested data (as indicated by the access rights system 202) does not include read access for the requested data (requested data in view of the query). In response to determining that the user-specific data permission for the user-specific data access role identified within the user token indicates that read access is not authorized for the requested data of the database 208 and the fields 220, the requested data is displayed as encrypted or masked data, at 322. For example, the requested data is displayed as encrypted or masked data by a graphical user interface of a display device associated with the application computing device 204 to the user 230.

In some examples, the database driver 212 determines that the user-specific data permission for the user-specific data access role identified within the user token indicates that write access is authorized for the requested data of the database 208 and the fields 220, at 324. That is, for the user-specific data access role of the user token, the data permissions for such data access role for the requested data (as indicated by the access rights system 202) includes at least write access for the requested data (requested data in view of the query). In response to determining that the user-specific data permission for the user-specific data access role identified within the user token indicates that write access is authorized for the requested data of the database 208 and the fields 220, the data fields 220 that are modified by the user 230 are encrypted and the database 208 is updated with the modifications to the data fields 220, at 326. In some examples, the database 208 is updated by the database driver 212 with the encrypted data fields with other data fields that are not required to be encrypted. In some examples, the database driver 212 determines which of the modified data fields by the user 230 are sensitive and require encryption, and encrypt the appropriate data fields prior to updating the database 208.

In some examples, the database driver 212 determines that the user-specific data permission for the user-specific data access role identified within the user token indicates that write access is not authorized for the requested data of the database 208 and the fields 220, at 324. That is, for the user-specific data access role of the user token, the data permissions for such data access role for the requested data (as indicated by the access rights system 202) does not include write access for the requested data (requested data in view of the query). In response to determining that the user-specific data permission for the user-specific data access role identified within the user token indicates that write access is not authorized for the requested data of the database 208 and the fields 220, any request for the modification of the requested data is rejected, at 328.

In some examples, the database driver 212 can record/store an audit log including user-specific data access information for the requested data.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method of managing access to data, comprising:
   storing, at a database server, a database that includes a plurality of fields;
   encrypting, at the database server and by a database driver of an application computing device, data of each field of the database using an application encryption algorithm;
   receiving, by the database driver and from an access rights system, data indicating user-specific data access roles and user-specific data permissions for each of the user-specific data access roles, each of the user-specific data permissions defining a subset of the data of the database that the corresponding user-specific data access role has authorization for decrypting the subset of the data;
   receiving, by the database driver, a user token representing credentials and user-specific data access roles of an authorized user, wherein the user token is generated by the access rights system;
   receiving, at the database driver, a query for requested data stored by the database;
   validating, by the database driver, the user token;

comparing, by the database driver, the user-specific data access role of the user token with the user-specific data access roles of the access rights system to identify user-specific data permissions for the user-specific data access role of the user token; and determining, by the database driver and based on the comparing, whether the user-specific data permissions for the user-specific data access role identified within the user token includes authorization for decrypting the requested data for the authorized user, including:

determining that the user-specific data permissions for the user-specific data access role identified within the user token indicates that read access is authorized for the requested data, and in response, displaying the requested data as unencrypted or unmasked data.

2. The method of claim 1, wherein determining, by the database driver and based on the comparing, whether the user-specific data permissions for the user-specific data access role identified within the user token includes authorization for decrypting the requested data for the authorized user further includes:

determining that the user-specific data permissions for the user-specific data access role identified within the user token indicates that read access is not authorized for the requested data, and in response, displaying the requested data as encrypted or masked data.

3. The method of claim 1, wherein determining, by the database driver and based on the comparing, whether the user-specific data permissions for the user-specific data access role identified within the user token includes authorization for decrypting the requested data for the authorized user further includes:

determining that the user-specific data permissions for the user-specific data access role identified within the user token indicates write access is authorized for the requested data, and in response, encrypting data fields modified by the user and updating the database with the modifications to the data fields.

4. The method of claim 1, wherein determining, by the database driver and based on the comparing, whether the user-specific data permissions for the user-specific data access role identified within the user token includes authorization for decrypting the requested data for the authorized user further includes:

determining that the user-specific data permissions for the user-specific data access role identified within the user token indicates write access is not authorized for the requested data, and in response, rejecting any request for modification.

5. The method of claim 1, further comprising:

recording, by the database driver, an audit log including user-specific data access information for the requested data.

6. The method of claim 1, wherein the user token is attached as a comment to the query.

7. The method of claim 1, further comprising refraining from adding additional query clauses to the query.

8. The method of claim 1, wherein the application encryption algorithm is an application agnostic encryption algorithm.

9. A computing environment for managing access to data, including:

a database server comprising a processor having access to memory media storing instructions executable by the processor to perform operations, comprising:

storing a database that includes a plurality of fields;

an access rights system comprising a processor having access to memory media storing instructions executable by the processor to perform operations, comprising:

providing data indicating user-specific data access roles and user-specific data permissions for each of the user-specific data access roles, each of the user-specific data permissions defining a subset of the data of the database that the corresponding user-specific data access role has authorization for decrypting the subset of the data;

an application computing device including a database driver, the application computing device comprising a processor having access to memory media storing instructions executable by the processor to perform operations, comprising:

encrypting, at the database server, data of each field of the database using an application encryption algorithm;

receiving a user token representing credentials and user-specific data access roles of an authorized user, wherein the user token is generated by the access rights system;

receiving a query for requested data stored by the database;

validating the user token;

comparing the user-specific data access role of the user token with the user-specific data access roles of the access rights system to identify user-specific data permissions for the user-specific data access role of the user token; and determining, based on the comparing, whether the user-specific data permissions for the user-specific data access role identified within the user token includes authorization for decrypting the requested data for the authorized user, including:

determining that the user-specific data permissions for the user-specific data access role identified within the user token indicates that read access is authorized for the requested data, and in response, displaying the requested data as unencrypted or unmasked data.

10. The computing environment of claim 9, wherein the operation of determining, based on the comparing, whether the user-specific data permissions for the user-specific data access role identified within the user token includes authorization for decrypting the requested data for the authorized user further includes:

determining that the user-specific data permissions for the user-specific data access role identified within the user token indicates that read access is not authorized for the requested data, and in response, displaying the requested data as encrypted or masked data.

11. The computing environment of claim 9, wherein the operation of determining, based on the comparing, whether the user-specific data permissions for the user-specific data access role identified within the user token includes authorization for decrypting the requested data for the authorized user further includes:

determining that the user-specific data permissions for the user-specific data access role identified within the user token indicates write access is authorized for the requested data, and in response, encrypting data fields modified by the user and updating the database with the modifications to the data fields.

12. The computing environment of claim 9, wherein the operation of determining, based on the comparing, whether the user-specific data permissions for the user-specific data access role identified within the user token includes authorization for decrypting the requested data for the authorized user further includes:
    determining that the user-specific data permissions for the user-specific data access role identified within the user token indicates write access is not authorized for the requested data, and in response, rejecting any request for modification.

13. The computing environment of claim 9, wherein the application computing device including the database driver further performs the operations of recording an audit log including user-specific data access information for the requested data.

14. The computing environment of claim 9, wherein the user token is attached as a comment to the query.

15. The computing environment of claim 9, wherein the application computing device including the database driver further performs the operations of refraining from adding additional query clauses to the query.

16. The computing environment of claim 9, wherein the application encryption algorithm is an application agnostic encryption algorithm.

17. An application computing device comprising a processor having access to memory media storing instructions executable by the processor to perform operations, comprising:
    receiving, from an access rights system, data indicating user-specific data access roles and user-specific data permissions for each of the user-specific data access roles, each of the user-specific data permissions defining a subset of data of the database that the corresponding user-specific data access role has authorization for decrypting the subset of the data, the data of the database including a plurality of fields that are encrypted using an application encryption algorithm;
    receiving a user token representing credentials and user-specific data access roles of an authorized user, wherein the user token is generated by the access rights system;
    receiving a query for requested data stored by the database;
    validating the user token;
    comparing the user-specific data access role of the user token with the user-specific data access roles of the access rights system to identify user-specific data permissions for the user-specific data access role of the user token;
    determining, based on the comparing, whether the user-specific data permissions for the user-specific data access role identified within the user token includes authorization for decrypting the requested data for the authorized user, including:
        determining that the user-specific data permissions for the user-specific data access role identified within the user token indicates that read access is authorized for the requested data, and in response, displaying the requested data as unencrypted or unmasked data.

18. The application computing device of claim 17, wherein the operation of determining, based on the comparing, whether the user-specific data permissions for the user-specific data access role identified within the user token includes authorization for decrypting the requested data for the authorized user further includes:
    determining that the user-specific data permissions for the user-specific data access role identified within the user token indicates that read access is not authorized for the requested data, and in response, displaying the requested data as encrypted or masked data.

19. The application computing device of claim 17, wherein the operation of determining, based on the comparing, whether the user-specific data permissions for the user-specific data access role identified within the user token includes authorization for decrypting the requested data for the authorized user further includes:
    determining that the user-specific data permissions for the user-specific data access role identified within the user token indicates write access is authorized for the requested data, and in response, encrypting data fields modified by the user and updating the database with the modifications to the data fields.

20. The application computing device of claim 17, wherein the operation of determining, based on the comparing, whether the user-specific data permissions for the user-specific data access role identified within the user token includes authorization for decrypting the requested data for the authorized user further includes:
    determining that the user-specific data permissions for the user-specific data access role identified within the user token indicates write access is not authorized for the requested data, and in response, rejecting any request for modification.

\* \* \* \* \*